(12) United States Patent
Park et al.

(10) Patent No.: US 7,050,085 B1
(45) Date of Patent: May 23, 2006

(54) SYSTEM AND METHOD FOR CAMERA CALIBRATION

(75) Inventors: Michael C. Park, Portland, OR (US); Scott Wilson, Sherwood, OR (US)

(73) Assignee: iMove, Inc., Portland, OR (US)

( * ) Notice: Subject to any disclaimer, the term of this patent is extended or adjusted under 35 U.S.C. 154(b) by 644 days.

(21) Appl. No.: 09/697,605

(22) Filed: Oct. 26, 2000

(51) Int. Cl.
*H04N 7/00* (2006.01)

(52) U.S. Cl. ........................................ 348/36

(58) Field of Classification Search ........ 348/142–187, 348/189, 36, 207.49; 382/294; 359/403; 345/418, 419; H04N 7/00
See application file for complete search history.

(56) References Cited

U.S. PATENT DOCUMENTS

| | | |
|---|---|---|
| 3,909,121 A | 9/1975 | de Mesquita Cardoso |
| 4,807,158 A | 2/1989 | Blanton et al. |
| 4,853,764 A | 8/1989 | Sutter |
| 5,023,725 A | 6/1991 | McCutchen |
| 5,130,794 A | 7/1992 | Ritchey |
| 5,235,198 A | 8/1993 | Stevens et al. |
| 5,329,616 A | 7/1994 | Silverbrook |
| 5,355,450 A | 10/1994 | Garmon et al. |
| 5,495,576 A | 2/1996 | Ritchey |
| 5,541,773 A | 7/1996 | Kamo et al. |
| 5,563,649 A | 10/1996 | Gould et al. |
| 5,619,255 A * | 4/1997 | Booth ......................... 348/36 |
| 5,648,813 A | 7/1997 | Tanigawa et al. ............. 348/10 |
| 5,650,814 A | 7/1997 | Florent |
| 5,657,073 A | 8/1997 | Henley |
| 5,677,981 A | 10/1997 | Kato et al. |
| 5,684,937 A | 11/1997 | Oxaal |
| 5,703,604 A | 12/1997 | McCutchen |
| 5,708,469 A | 1/1998 | Herzberg |
| 5,729,471 A | 3/1998 | Jain et al. |
| 5,748,121 A | 5/1998 | Romriell |
| 5,774,569 A | 6/1998 | Waldenmaier |
| 5,852,673 A | 12/1998 | Young |
| 5,872,575 A | 2/1999 | Segal |
| 5,886,745 A | 3/1999 | Muraji et al. |

(Continued)

OTHER PUBLICATIONS

Chen, Shenchang E., "Quick Time VR —An Image-Based Approach to Virtual Environment Navigation" *Computer Graphics Proceedings*, Annual Conference Series, Los Angeles, CA, Aug. 6-11, 1995, ACM-0-89791-701-4/95/008, pp. 29-38.

*Primary Examiner*—Tung Vo
(74) *Attorney, Agent, or Firm*—Fenwick & West LLP (57) ABSTRACT

A system and method for determining the adjustments that must be made to the individual images recorded by a multi-lens camera so that the images will fit together into a panorama. The camera is placed in the center of a structure, the edges of which have at least one row on indicia. Each camera records an image which includes the indicia along each edge that will be seamed with an edge of another image in order to form a panorama. Each edge of the structure which is along a seam that will be seamed with an edge of another image is recorded by two lenses on the camera. The amount of adjustment required to make the indicia in the two images fit together is then determined. The values of these adjustments are recorded along with an identification of the camera which recorded the images. Subsequent sets of images recorded by this same camera can then be seamed using the same adjustments.

15 Claims, 10 Drawing Sheets

U.S. PATENT DOCUMENTS

| | | | |
|---|---|---|---|
| 5,903,782 A | 5/1999 | Oxaal | |
| 5,933,137 A | 8/1999 | Anderson | |
| 5,936,630 A | 8/1999 | Oxaal | |
| 5,982,951 A * | 11/1999 | Katayama et al. | 382/284 |
| 5,990,934 A | 11/1999 | Nalwa | |
| 6,002,430 A * | 12/1999 | McCall et al. | 348/207.99 |
| 6,043,837 A | 3/2000 | Driscoll et al. | |
| 6,058,397 A | 5/2000 | Barrus et al. | |
| 6,072,496 A * | 6/2000 | Guenter et al. | 345/419 |
| 6,101,534 A | 8/2000 | Rothschild | |
| 6,118,454 A | 9/2000 | Oxaal | |
| 6,118,474 A | 9/2000 | Nayar | |
| 6,141,034 A * | 10/2000 | McCutchen | 348/36 |
| 6,157,385 A | 12/2000 | Oxaal | |
| 6,195,204 B1 * | 2/2001 | Nalwa | 359/403 |
| 6,215,519 B1 | 4/2001 | Nayar et al. | |
| 6,226,035 B1 | 5/2001 | Korein et al. | |
| 6,237,647 B1 | 5/2001 | Pong et al. | |
| 6,243,099 B1 | 6/2001 | Oxaal | |
| 6,252,603 B1 | 6/2001 | Oxaal | |
| 6,271,752 B1 | 8/2001 | Vaios | |
| 6,271,853 B1 | 8/2001 | Oxaal | |
| 6,323,858 B1 * | 11/2001 | Gilbert et al. | 345/419 |
| 6,323,862 B1 | 11/2001 | Oxaal | |
| 6,337,683 B1 * | 1/2002 | Gilbert et al. | 345/418 |
| 6,346,950 B1 | 2/2002 | Jouppi | |
| 6,359,617 B1 * | 3/2002 | Xiong | 345/848 |
| 6,456,323 B1 * | 9/2002 | Mancuso et al. | 348/218.1 |
| 6,549,681 B1 * | 4/2003 | Takiguchi et al. | 382/294 |
| 6,693,649 B1 * | 2/2004 | Lipscomb et al. | 345/762 |

* cited by examiner

SYSTEM AND METHOD FOR CAMERA CALIBRATION

APPENDIX ON A CD

Attached to this application is a CD (i.e. a compact disk) that includes text files (that is, an octal dump) of the programs listed below plus several text files.

a) A calibration program used to determine the parameters needed to seam images.

b) A seaming program which will seam images using the parameters determined by the calibration program.

c) Text files with a copyright notice, operating instructions and an example of camera calibration parameters.

FIELD OF THE INVENTION

The present invention relates to cameras and more particularly to a system and method for determining the characteristics of cameras.

BACKGROUND OF THE INVENTION

Panoramic images can be created by seaming together multiple single view images. Multi lens cameras are available which can simultaneously capture multiple single view images. The images captured by such a camera can be subsequently seamed into a panoramic image. Patent application Ser. No. 09/602,290 filed Jun. 23, 2000 describes an interactive seamer for creating panoramic images. Patent application Ser. No. 09/338,790 filed Jun. 23, 1999 describes a multi-lens cameras. The disclosure in the referenced patent application is hereby incorporated herein by reference.

It is practically impossible to obtain a set of single view images that fit together perfectly into a panorama. Parameters such as the heading, pitch, bank, offset, brightness and contrast of each image must be adjusted in order to make the images fit together into a panorama. One of the reasons that the parameters of the individual images must be adjusted is that the individual camera elements in the cameras that recorded the images have their own peculiarities and idiosyncrasies. In general each individual camera and each individual camera lens has parameters and idiosyncrasies that are peculiar and particular to that lens alone If one determines the adjustments that will make to one set of images (recorded by a particular camera) fit together to form a panorama, these adjustments will in general provide an acceptable modification for a different set of images from the same camera so that the second set of images will fit together into a panorama.

SUMMARY OF THE INVENTION

The present invention provides a system and method for determining the adjustments that must be made to the individual images recorded by a multi-lens camera so that the images will fit together into a panorama. With the present invention the camera is placed in the center of a structure, the edges of which have at least one row on indicia. Each camera records an image which includes the indicia along each edge that will be seamed with an edge of another image in order to form a panorama. Each edge of the structure which is along a seam that will be seamed with an edge of another image is recorded by two lenses on the camera. The amount of adjustment required to make the indicia in the two images fit together is then determined. The values of these adjustments are recorded along with an identification of the camera which recorded the images. Subsequent sets of images recorded by this same camera can then be seamed using the same adjustments.

Another feature of the present invention includes providing two rows of indicia along the edges of the cube. The two rows of indicia are spaced apart by an amount equal to the distance between the lenses on the camera. This eliminates the need to correct for parallax and eliminates the need to position the camera at the exact center of the cube. Another feature of this invention is that the shape of the indicia is distorted so that when the indicia are recorded through a fisheye lens, the dots appear un-distorted, thereby facilitating exact alignment of the images.

DETAILED DESCRIPTION

Figure 1:
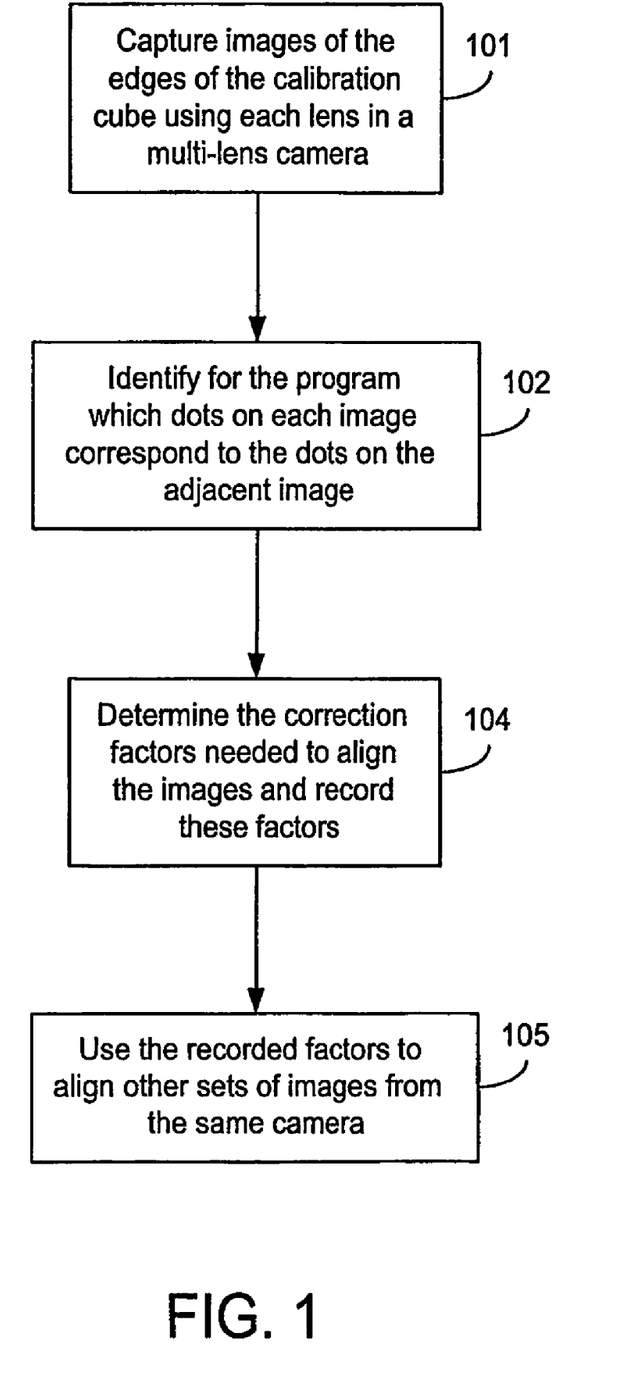
FIG. 1 is an overall process flow diagram.
Figure 2A:
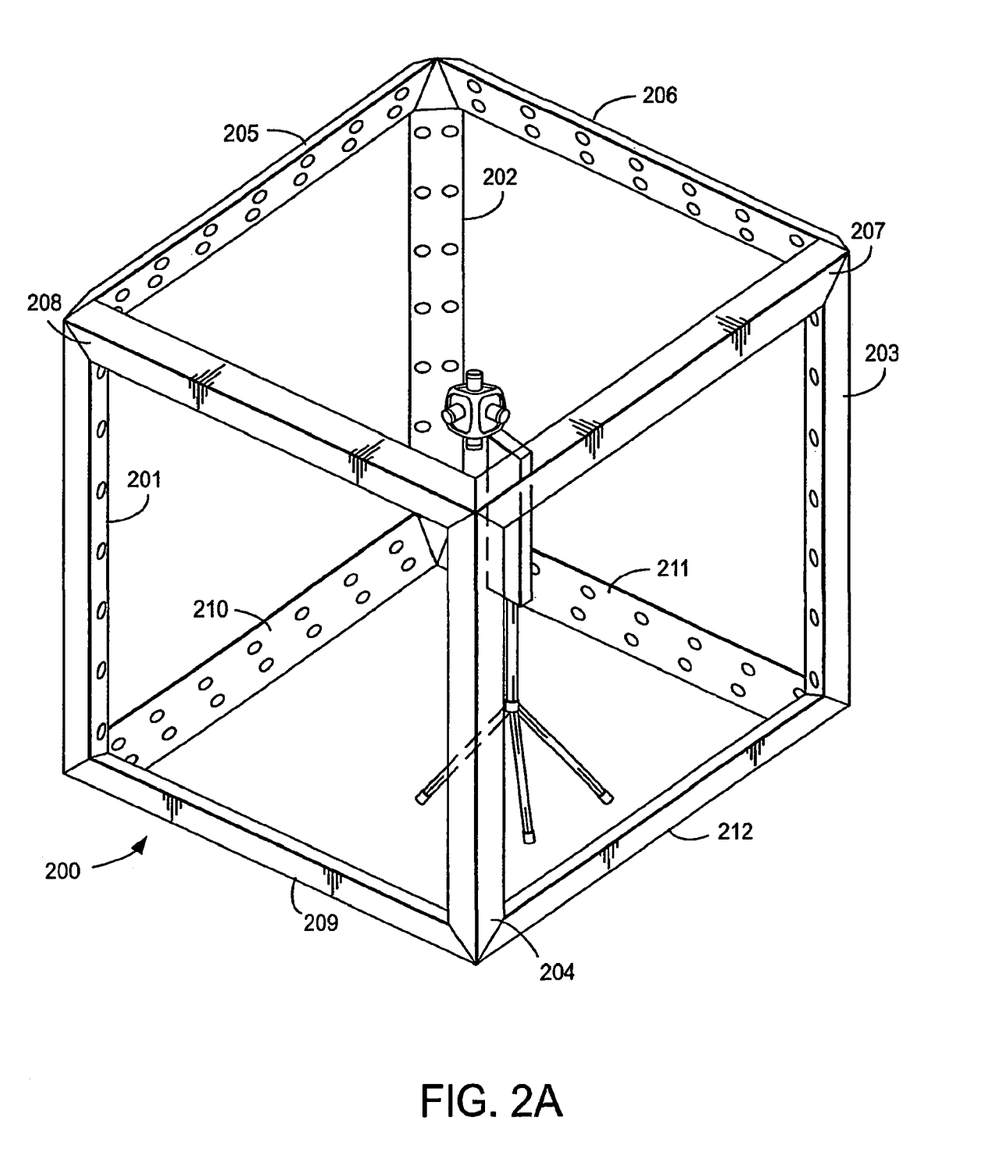
FIG. 2A is an overall diagram of the calibration cube.
Figure 2B:
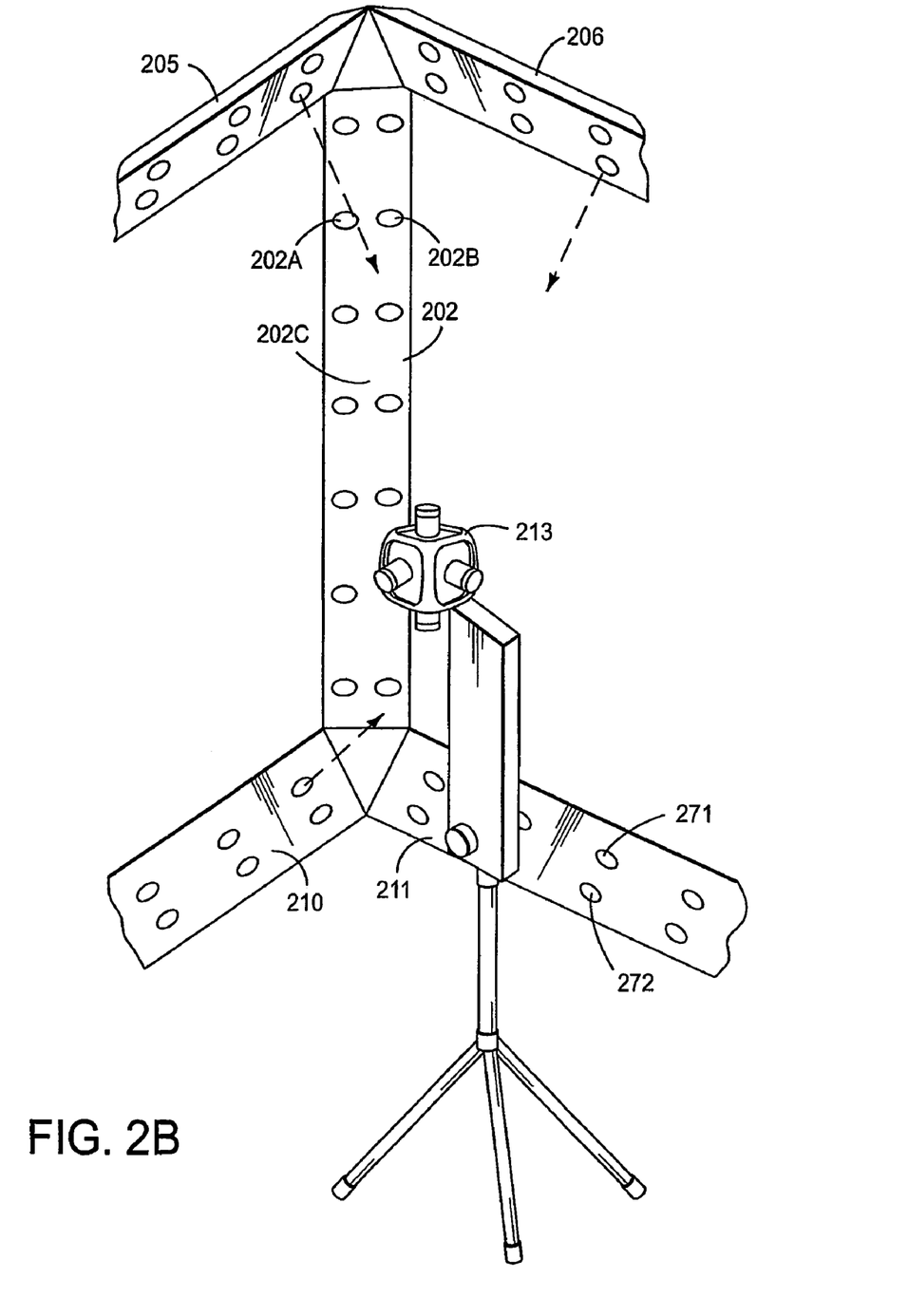
FIG. 2B is a more detailed view of a portion of the calibration cube.

An overall flow diagram of the process performed by a preferred embodiment of the invention is shown in FIG. 1. The calibration structure used is shown in FIGS. 2A and 2B. The calibration structure 200 is cube shaped. First, as indicated by block 101 a particular camera 213 is used to capture images of the edges of the calibration cube 200. The images so captured can be termed calibration images.

The camera is a multi-lens camera with one lens pointing toward each side of the cube 200. A detailed description of camera 213 is given in co-pending application Ser. No. 09/338,790 filed Jun. 23, 1999 entitled "System for Digitally Capturing and Recording Panoramic Movies" the specification of which is hereby incorporated herein by reference. The camera 213 has six lenses and six images, one of each side of cube 200, are simultaneously recorded. Two lenses of camera 213 capture an image of each edge of the cube 200.

Figure 3A:
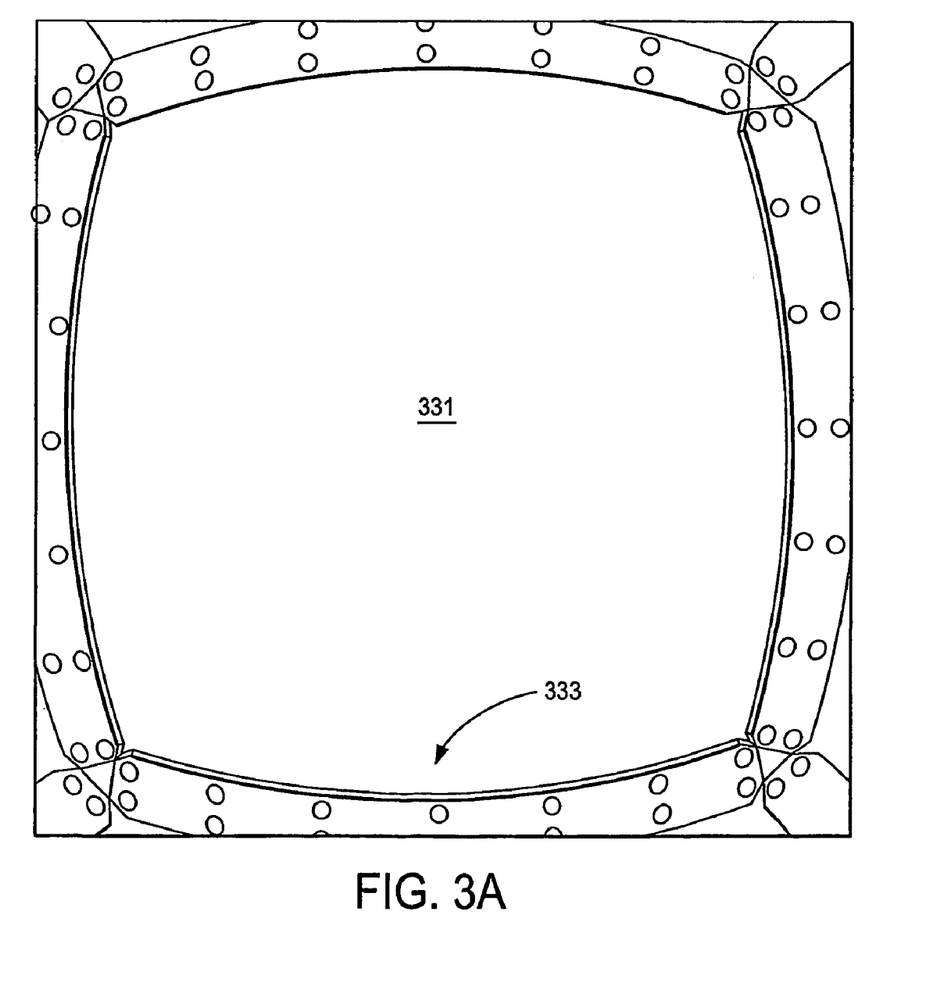
FIG. 3A shows an image recorded through a single lens on the camera.

FIG. 3A shows an example of an image 331 captured by one lens of camera 213. At the edge of image 331 (and at the edge of each image captured by camera 213) there are two rows of dots corresponding to the dots along one edge of cube 200. Since two lenses capture each edge of the cube 200, for each edge of cube 200, there are two images that show the same row of dots.

After the images have been recorded, the operator manually indicates to the program (as indicated by block 102) which dots in the various images correspond to each other.

Figure 3B:
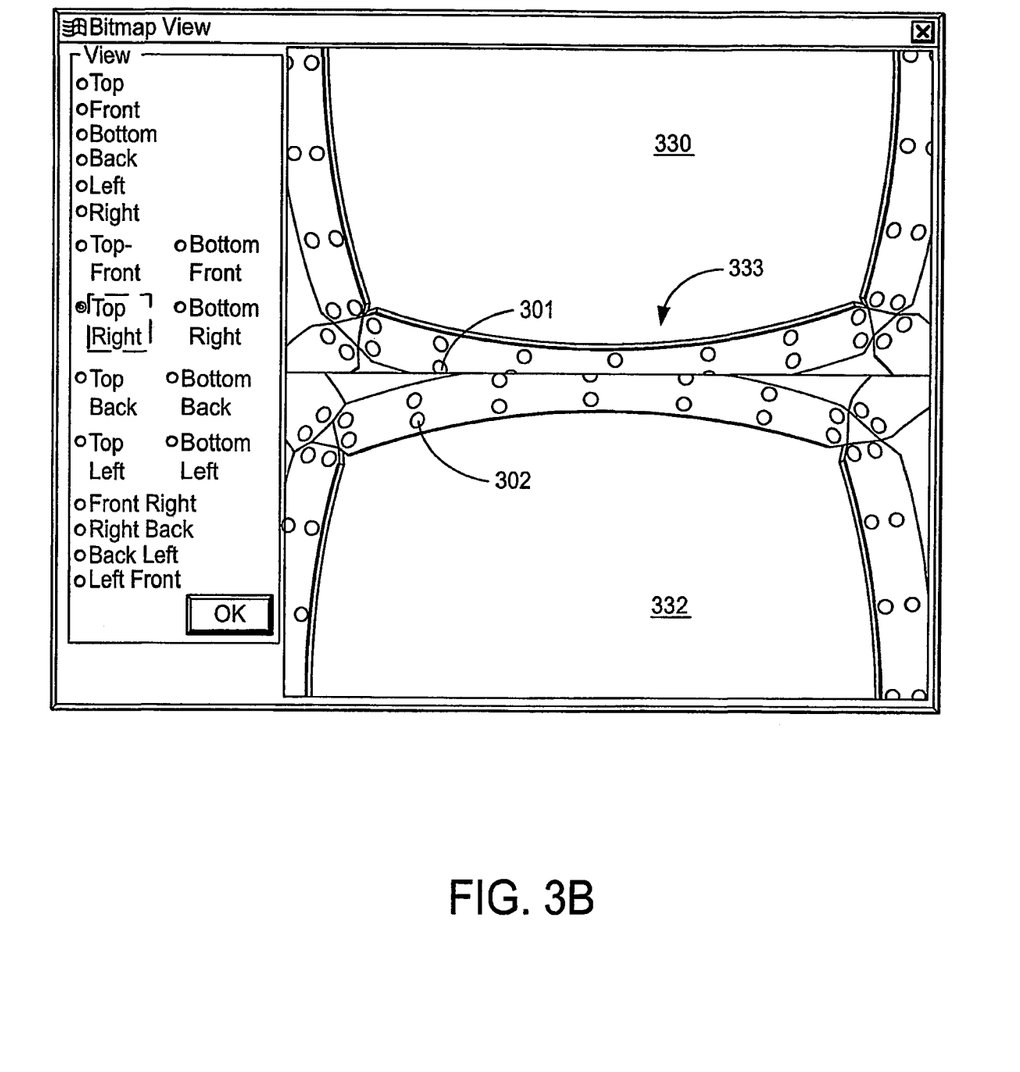
FIG. 3B shows two images displayed side by side, so that corresponding dots can be identified.

During this step, the two images which show the same edge of the cube are displayed adjacent to each other as shown in FIG. 3B. The operator manually identified to the program which dots correspond in the two images. The operator does this by first clicking (with a mouse) on a "start" button and by then "clicking" on the two corresponding dots in sequence. The program recognizes the sequential "clicks" as indicating that the dots correspond.

Next as indicated by block 104, the operator finds the settings of various parameters needed in order to align the images so that they can be seamed into a panorama without artifacts. The correction factors found are recorded along with an identification of the camera that created recorded the images. In the first preferred embodiment, the parameters of the camera that are determined for each of the six camera lenses are:

a) camera aiming which includes heading pitch and bank,
b) field of view,
c) offset of the camera lens to the CCD,
d) amount of pin cushion distortion in the camera lens,
e) amount of pitch, roll, heading and offset.

In the following discussion, when reference is made to camera parameters, it is the above parameters that are being discussed. It is however, noted that the invention could be extended to other camera parameters (or some could be eliminated) as necessary for particular applications.

A camera that went through the above process can then be used to record some other set of images and the parameters determined as described above can be used to seam this new set of images. That is, the final step 105 shown in FIG. 1 is performed on a new set of images which were recorded with a previously calibrated camera. At this point the previously determined correction factors are applied to the new set of images.

FIG. 2A is an overall diagram of the calibration cube 200 showing the twelve edge panels designated 201 to 212. A camera 213 is positioned approximately at the center of the cube. All twelve panels 201 to 212 are identical and thus only panel 202 will be discussed in detail. FIG. 2B shows panel 202 and the panels connected to it in more detail. Panel 202 has two rows of dots designated 202A and 202B positioned on the panel. The panels are positioned at a 45 degree angle relative to the sides of the cube. If a line were drawn from the center of each panel (for example from point 202C) perpendicular to the surface of the panel the line would go to the center of camera 213.

When activated, camera 213 records an image of each side of the cube 200. Each image so recorded includes the four panels surrounding the sides of the cube which is recorded. An example of such an image is shown in FIG. 3A. It is important to note that each edge panel is recorded by two lenses from camera 213. Thus, each edge of the cube appears on two images.

Figure 2C:
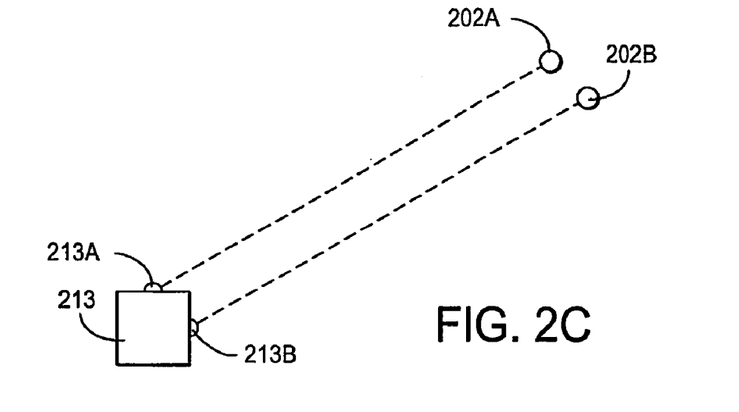
FIG. 2C is an illustration showing why the rows of dots are spaced apart.

The distance between the two rows of dots on each panel matches the distance between the lenses on camera 213. This is done in order to eliminate the need for any adjustment due to parallax. The reason for this is illustrated in FIG. 2C which illustrates two lenses 213A and 213B on camera 213 and the two dots on panel 202A and 202B on panel 202. Since the dots are spaced the same distance apart as the lenses which recorded the dots, there is no need for a parallax adjustment to take into account the distance of the camera 213 from the panel 202. Naturally the program that matches images taken by the two lenses must take into account that the two rows of dots are separated by a certain amount of distance.

FIG. 3B illustrates how the operator identifies to the program which dots in adjacent images correspond. The images illustrated in FIG. 3B are an example of the images used in the operation indicated by block 102 in FIG. 2. As illustrated in FIG. 3B, the program displays two images 331 and 332 side by side so that the operator can see at least a portion of both rows of dos in both images. For example FIG. 3B shows the image taken by lens 213A next to the image taken by lens 213B. The rows of dots on panel 202 appear in both images. The program includes shape recognition logic that locates and records in a table the position of each dot.

An example of the main elements of such a table are given in Table One below.

TABLE ONE

| Image ID # | Dot ID # | X position | Y position | Cor-Dot ID |
|---|---|---|---|---|
| IM0097 | D301 | 456 | 237 | D302 |
| IM0098 | D302 | 159 | 857 | D301 |

In the above table, each row pertains to a particular dot. The columns in the table give the following information:

Image ID # A unique number that identifies a particular image
Dot ID # A unique number that identifies a particular dot
x Position The x position of the particular dot
y Position The y position of the particular dot
Cor-Dot ID The Dot ID-number of a corresponding dot on a different image. The information in this column is entered after the operator identified to the program which dots in the two images correspond.

When as illustrated in FIG. 3B, the images are displayed next to each other an operator can easily visually identify the corresponding dots. For example dot 301 corresponds to dot 302. After clicking on a "start" button to initiate the operation, the operator first "clicks" on dot 301 and then the operator clicks on dot 302. This tells the program that these two dots correspond and the program records in the last column of the above table the fact that these two dots correspond. The operator sequentially does this for each dot along edge 202P. The process is repeated for each of the twelve edges of the cube 200.

It is noted that each images does not need to contain a complete image of both rows of dots. For example, the bottom of image 331 shown in FIGS. 3A and 3B does not contain a complete image of both rows of dots. The two adjacent dots (for example dots 271 and 272 in FIG. 2B) can be considered as constituting a hypothetical bar or area that begins at one dot and ends at the other dot. When the operator sequentially clicks on dots 301 and 302 (see FIG. 3B), the operator is identifying to the program the two "hypothetical bars" or area contain corresponding dots in the two images. Since each image shows at least the inside row of dots on each panel, and the distance between the rows of dots is known to the program, the program can determine the location of all dots, even if they are not explicitly shown in the image.

Next the program seams the images into a panorama using a set of default parameters. When the program is initiated it brings up the window shown in FIG. 3C. The window shows a panorama with no images loaded. On the right side of the screen are various adjustments that can be made to images which are to be seamed into a panorama. These parameters are initially set to a set of default parameters such as shown below. The six cameras are identified as the Top, Front Bottom Back Left and Right cameras. The Field of View (FOV), Heading, Pitch, Bank, x Offset and y Offset for the cameras are initially set to the values shown in the following table. It should be understood that the following initial values are only examples and the values for various types of cameras can be determined by experimenting to find which give the best results.

TABLE TWO

| Camera | FOV | Heading | Pitch | Bank | x offset | y Offset |
| --- | --- | --- | --- | --- | --- | --- |
| Top | 95 | 180 | 90 | 0 | 0 | 0 |
| Front | 95 | 0 | 0 | 0 | 0 | 0 |
| Bottom | 95 | 0 | -90 | 0 | 0 | 0 |
| Back | 95 | 180 | 0 | 0 | 0 | 0 |
| Left | 95 | -90 | 0 | 0 | 0 | 0 |
| Right | 95 | 90 | 0 | 0 | 0 | 0 |

Provision is also made for other parameters that can be used if desired. For example the amount of Fisheye adjustment on pin cushion adjustment can be set.

Figure 3C:
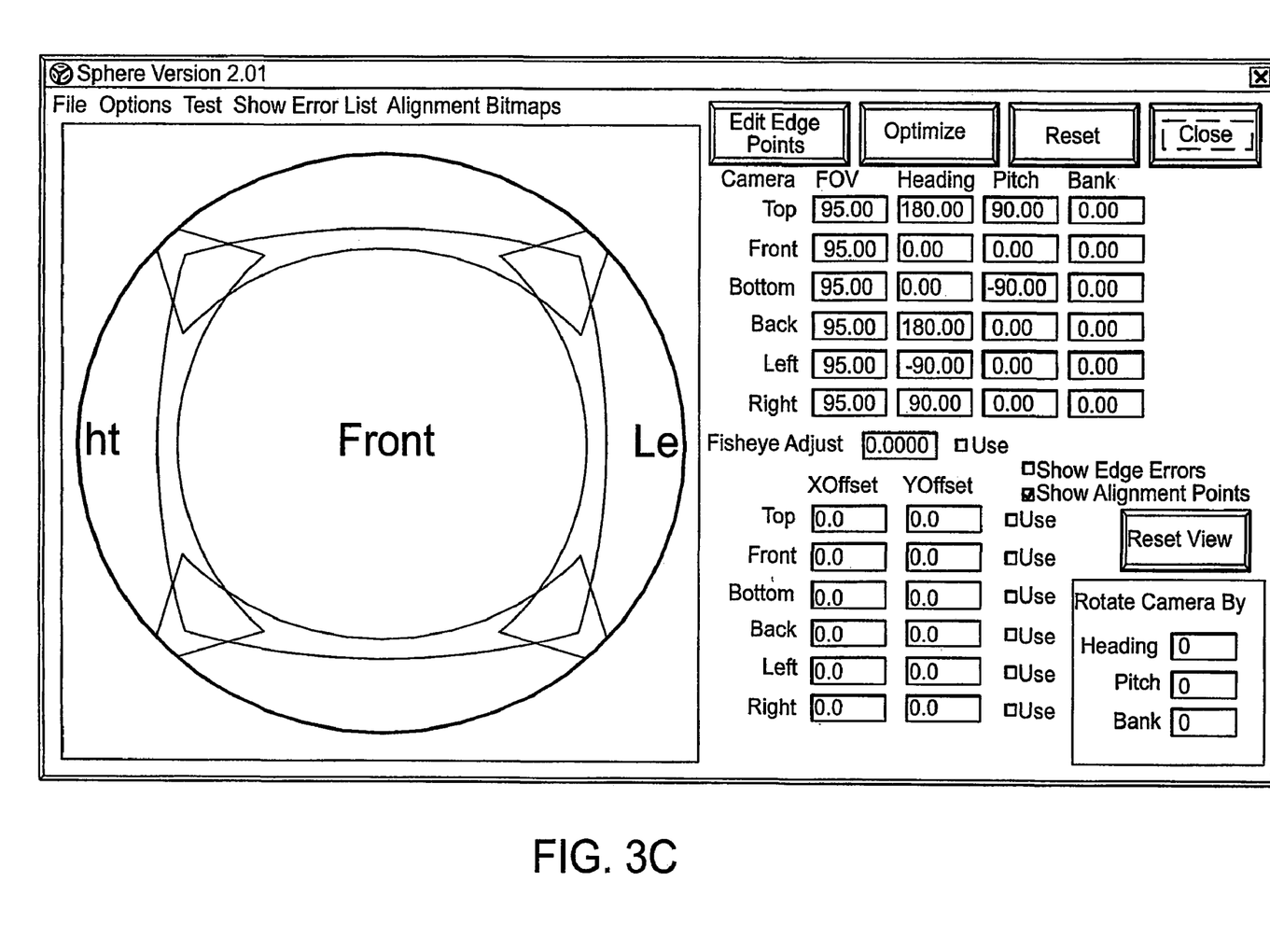
FIG. 3C shows a blank unit sphere and the default parameters used to initially seam images into a panorama.
Figure 4:
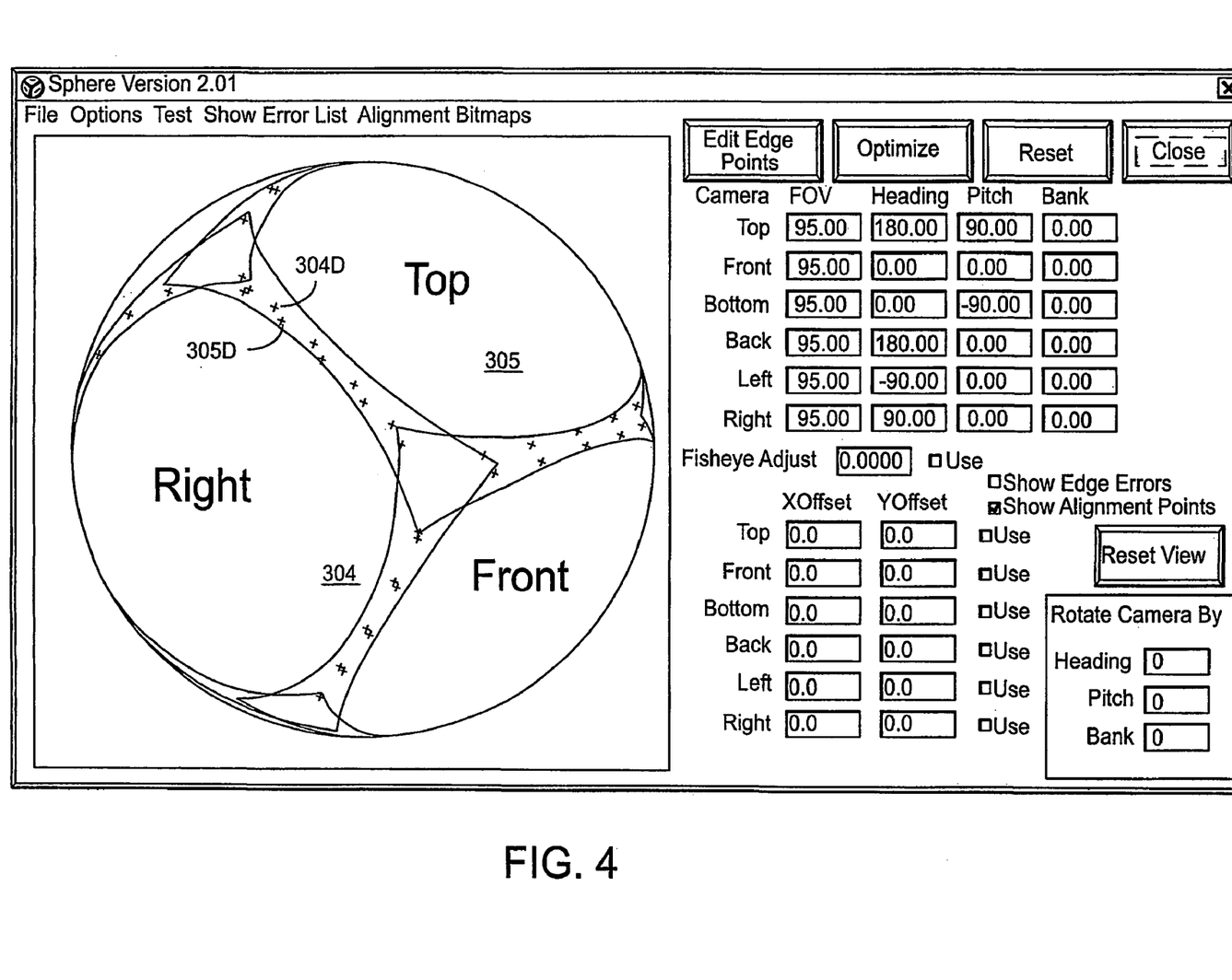
FIG. 4 shows multiple images seamed together using default parameters and the rows of dots do not coincide.

The images as seamed using the default parameters are shown to the operator as shown in FIG. 3C. As shown in FIG. 4, the images have been seamed, but the dots on the various images do not correspond. For example, dot 304D from image 304 should coincide with dot 305D from image 305. However, the default parameters which produced the panorama shown in FIG. 4 did not seam the images as they should be and hence the dot 304D and dot 305D do not coincide. The operator can then change the various parameters used during the seaming operation in order to make the dots coincide. This is similar to the manual operation described in co-pending application Ser. No. 09/602,290 filed Jun. 23, 2000 (the specification and drawings of which are hereby incorporated herein by reference).

Figure 6:
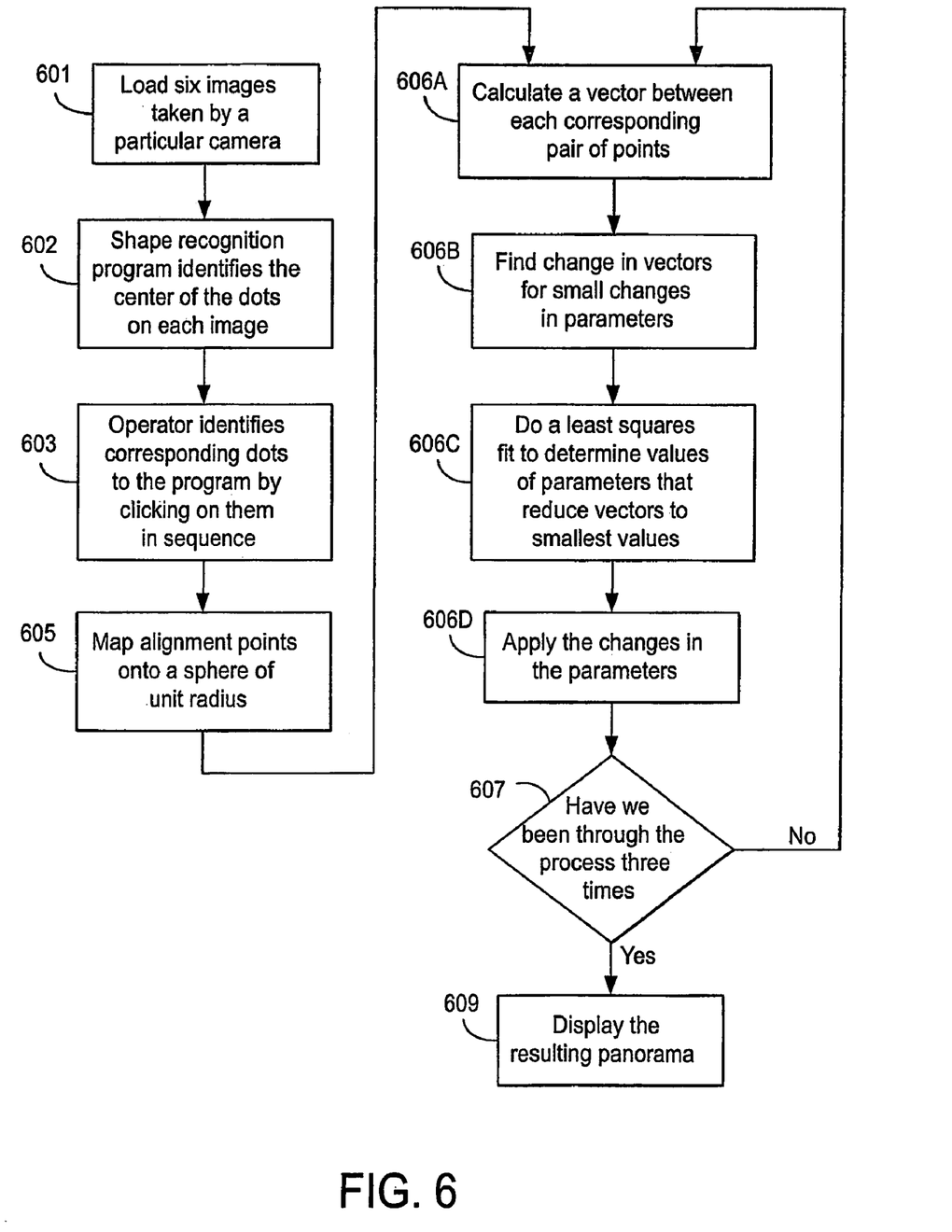
FIG. 6 is a flow diagram showing the operation of the program.

FIG. 6 is a program flow diagram showing in detail how the program performs the operations indicated by blocks 102, 104 and 105 in FIG. 1. That is, FIG. 6 is a flow diagram showing how the corresponding dots on a set of images are identified, the appropriate correction factors are determined to make the dots coincide (i.e. the appropriate correction factors are determined in order to properly seam the images and finally how these parameters are used to seam another set of images recorded by the same camera.

First as indicated by block 601, the six bitmaps (i.e. the six images) recorded by a particular camera 213 are loaded into the program. These images show the edges of calibration cube 200. Each edge appears in two of the images. Next as indicated by block 602 a conventional shape recognition routine is used to identify the location of the center of the dots at the periphery of each image.

The operator next identifies corresponding dots to the program as indicated by block 603. The operator can for example visually determine that dots 301 and 302 shown in FIG. 3B are in fact the same dot on the frame edge and that these dots should coincide. The operator uses a mouse to click in sequence on the corresponding dots. The program recognizes the clicks as indicating that the two dots on which the operator has clicked correspond. The identity of the corresponding dots are then recorded in a table such as the previously give Table One. Corresponding dots are termed alignment points.

Next as indicated by block 605, the alignment points are mapped onto a sphere of unit radius. The mapping is done using a default set of parameters for camera direction, field of view, lens distortion, etc. The heading and pitch of each alignment point on the sphere is determined. Zero pitch and zero heading is taken as perpendicular to the center of each image.

The next series of steps 606A to 606D is at the heart of the calibration process. A least squares fitting process is used to change the various parameters so that the corresponding dots in the images coincide with each other. First as indicated by block 606A a vector is established going between each pair of corresponding points. For example a vector going between 301 and 302 is FIG. 3B is calculated. A similar vector is calculated for each pair of points. The length of the vector represents the amount of error in the alignment of the points.

Next as indicated by block 606B, the amount of change in each vector which results from a small change in each lens parameter is determined. That is, each of the lens parameters such as heading, field of view etc. is changed by a small increment and the resulting change in the length of the vectors is determined. The lens parameters are changed one at a time and the resulting change in each vector is determined.

A conventional least squares fit for the error vectors is calculated to determine the changes in the camera parameters that reduce the error vectors to the smallest values. This is indicated by block 606C. Next the changes are applied to the parameters as indicated by block 606D. If the effect of changes in camera parameters on the error vectors was linear, it would only be necessary to go through steps 606A to 606D one time. However, the effect on the error vectors of changing the camera parameters is not linear, hence, steps 606A to 606D re executed three times as indicated by block 607. Each time steps 606A to 606D are executed the result converges closer to the optimum values. Naturally it will be understood by those skilled in the art that the selection of three times is arbitrary and based on experience and that a number is selected that produces a result of sufficient accuracy.

After the process in blocks 606A to 606D has been repeated three times, the resulting panorama is displayed to the operator to insure that the process has been successful. If the panorama displayed is not satisfactory the operations are repeated. If the resulting panorama is acceptable, the operator saves the values of the parameters which generated the satisfactory panorama.

It has been found that if the program is given the freedom to change all the camera parameters, the result can be a relatively large change in the field of view from one particular camera to another particular camera. While this does get the image into alignment, it adds a certain amount of size distortion to the image. This potential problem can be avoided by giving the operator the ability to lockout (not use) some of the camera offsets during the least squares fit operation. Alternate embodiments provide a mechanism whereby the program automatically determines which offsets to lock during the least squares fit operation.

Figure 5:
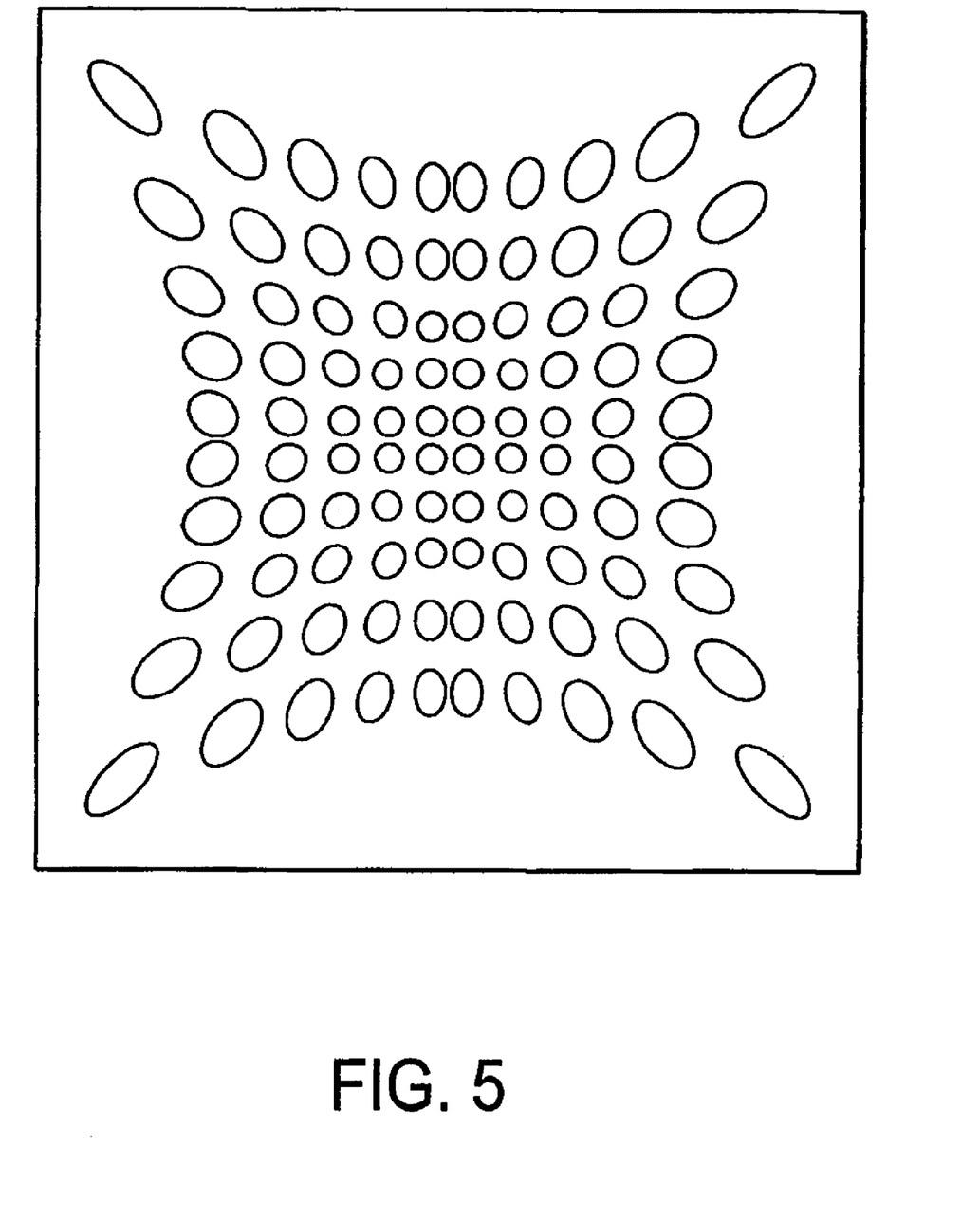
FIG. 5 illustrates the distortion to dots caused by a lens.

Another feature of this invention is that the dots on the edges of the cube 200 are not in fact round. It is known that when a circle is viewed through a fisheye lens the image of the circle will not be round. The distortion produced by a fisheye lens can be understood by examining FIG. 5. FIG. 5 shows a array of dots that has been distorted so that when viewed through a fisheye lens these dots will appear as a square array. The amount of distortion theoretically produced by a fisheye lens is know in the art. Each dot shown in FIG. 5 has a shape such that when the dot is viewed through a fisheye lens, the dot appears round. This same type of distortion is provided for the dots on panels 201 to 212.

That is, each dot on the panels 201 to 212 has a shape so that when the dot is viewed through a fisheye lens, the dot appears as a round dot. This facilitates the recognition and location of the dots by the program. It is noted that in FIG. 5, the rows of dots are not straight, that is, the rows are concave. The shape of the individual dots on panels 201 to 212 is distorted as described above; however, the rows of dots are straight. Since the rows of dots on panels 201 to 212 are straight, the rows of dots in the images such as shown in FIG. 3A are convex due to the action of the fisheye lens. Naturally, if the system used a lens type other than fisheye, the dots would have a distortion corresponding to the distortion produced by the particular type of lens used.

In an alternate embodiment of the invention, a program is provided which automatically identifies the corresponding dots in adjacent images. this eliminates the need for the operator to identify corresponding dots to the program operator.

It is noted that the calibration structure used by the preferred embodiment is in the shape of a cube. The reason for this is that the camera 213 is in the shape of a cube. That is, the lenses on camera 213 are positioned on the sides of a cube. If the lenses where positioned differently, the structure would have a different shape. The term "edge which will be seamed" is used to mean an edge of an image which will be seamed with the edge of another image to create a panorama. The structure must have a shape so that (a) each edge which will be seamed is captured by two lenses, and (b) the image captured by each camera includes at least one row of dots along each edge which will be seamed. In the preferred embodiment, each edge panel 201 to 212 is captured by two lenses, and the image captured by each lens contains at least one row of dots along each edge. If the lenses of a camera are positioned in a configuration which differs from the positions of the lenses on camera 213, the calibration structure would have a different shape. The important point is that the calibration structure would have a shape such that (a) each edge which will be seamed is captured by two lenses, and (b) the image captured by each camera includes at least one row of dots along each edge which will be seamed. Many alternatives could be found which meet the above criteria. As a simple example, if the camera was a cube with two lenses on the top side of the cube, each of which captured 45 degrees, the calibration structure would be a cube with a panel at the middle of the top of the cube.

It is noted that in the preferred embodiment the indicia along the edges of the cube are in the shape of dots which appear as round areas on the captured images (after they have been distorted by a fisheye lens). Alternatively, indicia with other shapes could be used. For example, the indicia on the panels 201 to 212 could be in the shape of bars. These bars could be pre-distorted so that the appear rectangular after being distorted by a fisheye lens. The pre-distortion is only needed to make the recognition logic in the program simpler; however, it is not required for the operation of the invention. A wide variety of indicia shapes could be used as alternatives to the shape used in the preferred embodiment.

The identification of the camera that recorded a particular set of images can be manually recorded and then this identification can be applied to a set of camera parameters determined as described above. In an alternate embodiment described with reference to FIG. 7, the multi lens camera automatically records on each image an identification as described in co-pending application Ser. No. 60/218,604 filed Jul. 17, 2000 (the specification and drawings of which is hereby incorporated herein by reference). It is noted that the images recorded by the cameras described herein are digital in nature. Hence the images recorded at one time can be stored in a file. The camera identification is placed in a header in this file.

Figure 7:
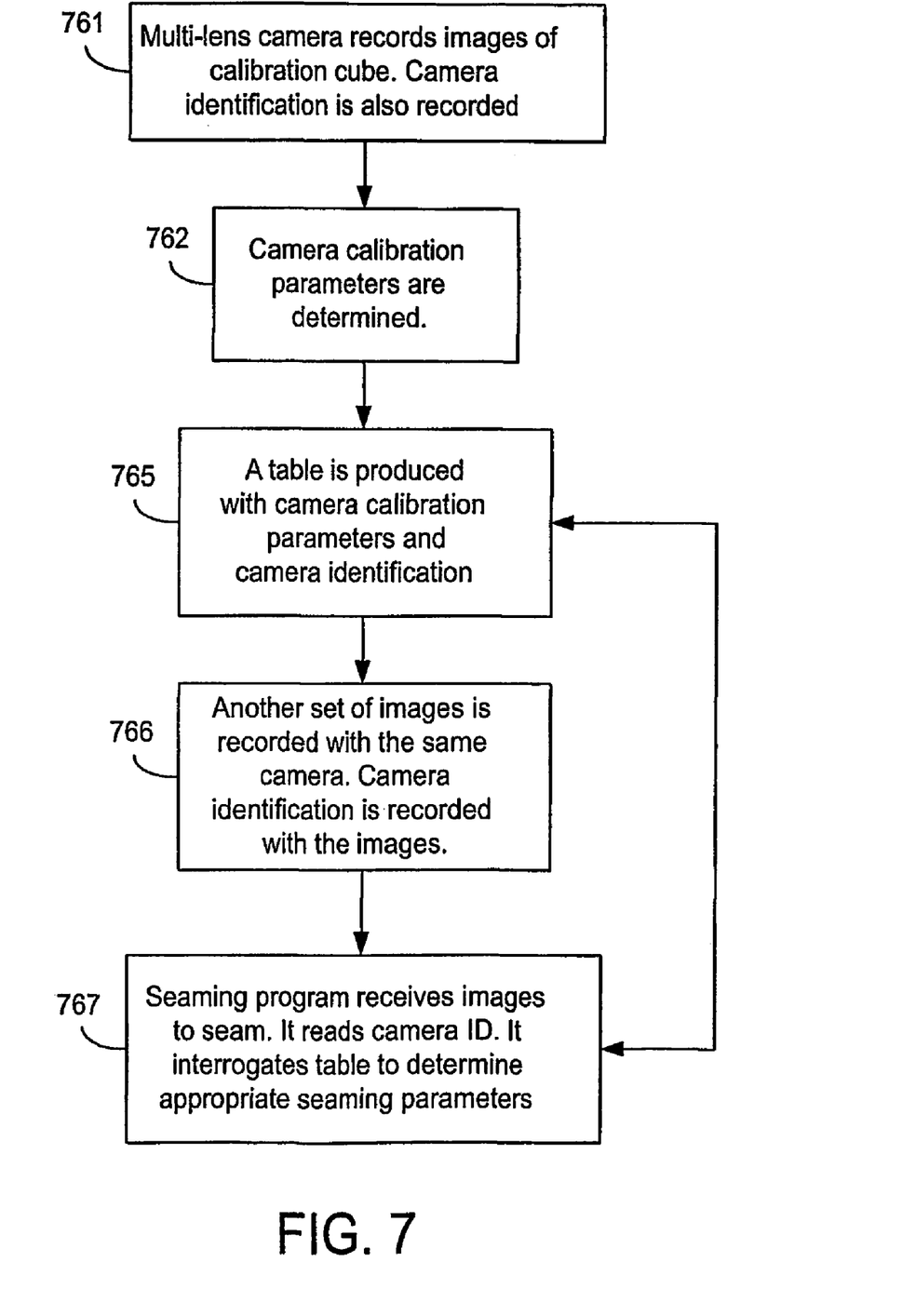
FIG. 7 is a flow diagram of an alternate embodiment of the invention.

In this embodiment, the calibration program reads this camera identification from the file header of the file that contains the images. The calibration program then records the camera identification along with the calibration parameters for that particular camera. The result is a table showing camera identification numbers and corresponding calibration parameters. When a set of images is read by the seaming program, it automatically reads the camera identification from the file header of the file that contains the images. The process is shown in FIG. 7. First, as indicated by block 761, a camera records an image of the calibration cube as described above. The single view images generated are recorded along with the camera identification as described in the above referenced patent application. Next as indicated by block 762. The camera calibration parameters are determined as described above.

As indicated by block 765, a table is produced showing camera calibration parameters and camera identification. At a later time another set of images is recorded with this same camera as indicated by block 766. The camera identification is recorded along with the images. Finally, as indicated by block 767, when the images are sent to a seaming program, the camera identification is reads the camera identification along with the image data. The seaming program interrogates the table to find the correct parameters to use to seams the images using the appropriate parameters.

This application includes an appendix submitted on a CD (i.e. a compact disk). The CD includes the text files (i.e. octal dumps) of executable programs and other text files as listed below:

a) A calibration program used to determine the parameters needed to seam images.

b) A seaming program which will seam images using the parameters determined by the calibration program.

c) Text files with a copyright notice, operating instructions and an example of camera calibration parameters.

While the invention has been shown and described with respect to preferred embodiments thereof, it will be understood by those skilled in the art that various changes in form and detail can be made without departing from the spirit and scope of the invention. Many different embodiments of the applicant's invention are possible and the invention is not limited to only the embodiment described herein. Applicant's invention is limed only by the scope of the appended claims and equivalents thereof.

We claim:

1. A method for calibrating a panoramic camera system that captures overlapping single view images that are seamed together into a panorama, the method comprising:

capturing a first single view image of a structure, the first single view image including first indicia along an edge of the structure;

capturing a second single view image of the structure, the second single view image including second indicia along the same edge of the structure, wherein the first and second single view images are to be seamed together along the edge; and adjusting one or more camera parameters for a first camera element within the panoramic camera system and adjusting one or more camera parameters for a second camera element within the panoramic camera system to seam together the first indicia with the second indicia, wherein the first single view image is captured by the first camera element and the second single view image is captured by the second camera element.

2. The method of claim 1 wherein the step of adjusting camera parameters comprises:
adjusting one or more camera parameters, attempting to make the first indicia coincide with the second indicia.

3. The method of claim 2 wherein the edge of the structure contains a row of indicia, the first indicia includes the row of indicia and the second indicia includes the same row of indicia.

4. The method of claim 2 wherein the edge of the structure contains two rows of indicia, the first indicia includes one of the rows of indicia and the second indicia includes the other row of indicia.

5. The method of claim 4 wherein the two rows are separated by a spacing that accounts for parallax between capture of the first single view image and capture of the second single view image.

6. The method of claim 1 wherein at least one of the camera parameters is selected from a group consisting of offset, distortion, brightness and contrast.

7. The method of claim 1 wherein at least one of the camera parameters is selected from a group consisting of heading, pitch, bank, and field of view.

8. The method of claim 1 wherein the step of adjusting camera parameters comprises:
automatically locking out one or more camera parameters during adjustment of the camera parameters.

9. The method of claim 1 wherein the indicia are shaped so they assume a preselected shape after distortion by image capture.

10. A method for calibrating a panoramic camera system that captures overlapping single view images that are seamed together into a panorama, the method comprising:
capturing a first single view image of a structure, the first single view image including first indicia along an edge of the structure;
capturing a second single view image of the structure, the second single view image including second indicia along the same edge of the structure, wherein the first and second single view images are to be seamed together along the edge;
estimating locations of the first indicia;
estimating locations of the second indicia; and
adjusting one or more camera parameters, attempting to minimize a squared error between the locations of the first indicia and the locations of the second indicia, attempting to make the first indicia coincide with the second indicia.

11. A method for calibrating a panoramic camera system that captures overlapping single view images that are seamed together into a panorama, the method comprising:
capturing a first single view image of a structure, the first single view image including first indicia along an edge of the structure, wherein the step of capturing the first single view image comprises a first lens capturing the first single view image, wherein the panoramic camera system comprises a multi-lens camera with first and second lenses;
capturing a second single view image of the structure, the second single view image including second indicia along the same edge of the structure, wherein the step of capturing the second single view image comprises the second lens capturing the second single view image and the first and second single view images are to be seamed together along the edge; and
adjusting one or more camera parameters to seam together the first indicia with the second indicia.

12. The method of claim 11 wherein the lenses within the multi-lens camera are oriented orthogonally to each other for capturing different faces of a cube.

13. A computer readable medium containing a software program for implementing a method for calibrating a panoramic camera system that captures overlapping single view images that are seamed together into a panorama, wherein the panoramic camera system comprises a multi-lens camera, a first single view image is captured by a first camera element within the multi-lens camera, and a second single view image is captured by a second camera element within the multi-lens camera the method comprising:
receiving a first single view image of a structure, the first single view image including first indicia along an edge of the structure;
receiving a second single view image of the structure, the second single view image including second indicia along the same edge of the structure, wherein the first and second single view images are to be seamed together along the edge;
adjusting camera parameters to seam together the first indicia with the second indicia;
recording adjusted parameters for the first camera element along with an identification of the first camera element; and
recording adjusted parameters for the second camera element along with an identification of the second camera element.

14. The computer readable medium of claim 13 wherein the method further comprises:
recording the adjusted camera parameters along with an identification of the panoramic camera system.

15. The computer readable medium of claim 13 wherein the method further comprises:
retrieving and using the adjusted camera parameters to seam together other single view images captured by the panoramic camera system.

* * * * *